No. 882,893. PATENTED MAR. 24, 1908.
C. E. KNIGHT.
SECTIONAL HOG AND POULTRY CRATE.
APPLICATION FILED JUNE 24, 1907.
2 SHEETS—SHEET 2.
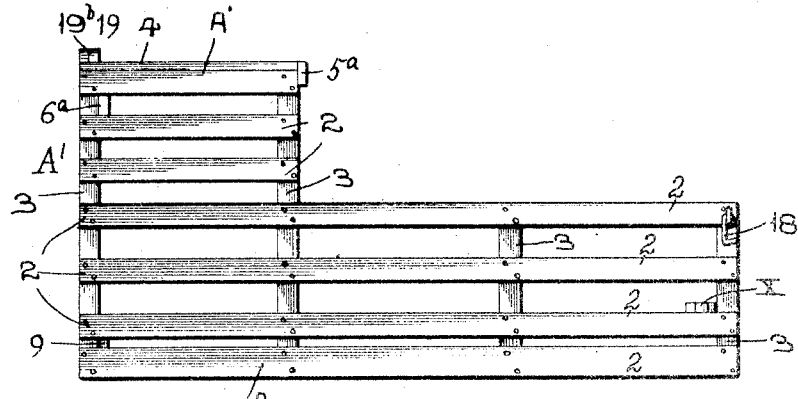
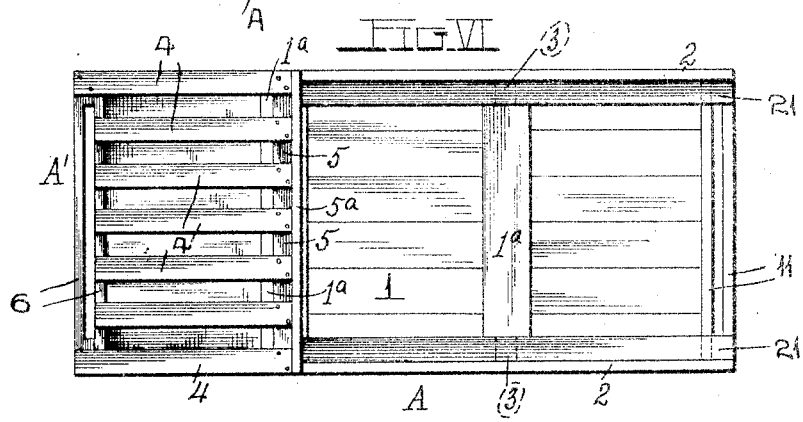
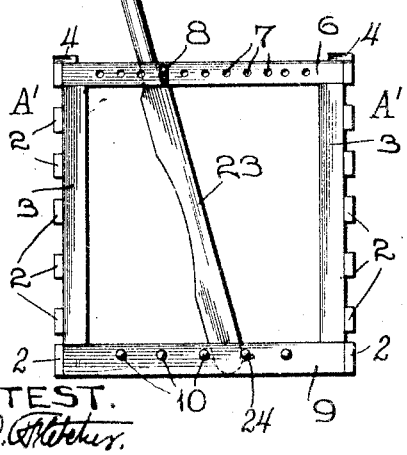
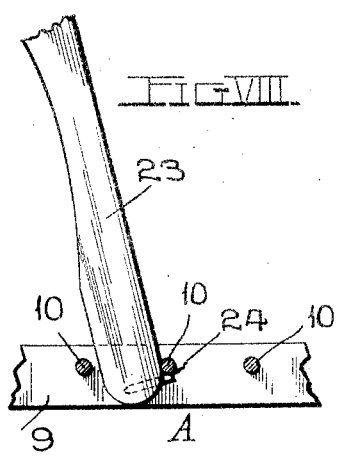
ATTEST.
H. J. Fletcher.
Lily Rost
INVENTOR.
CHARLES E. KNIGHT.
BY Geo. T. Knight ATT'Y.

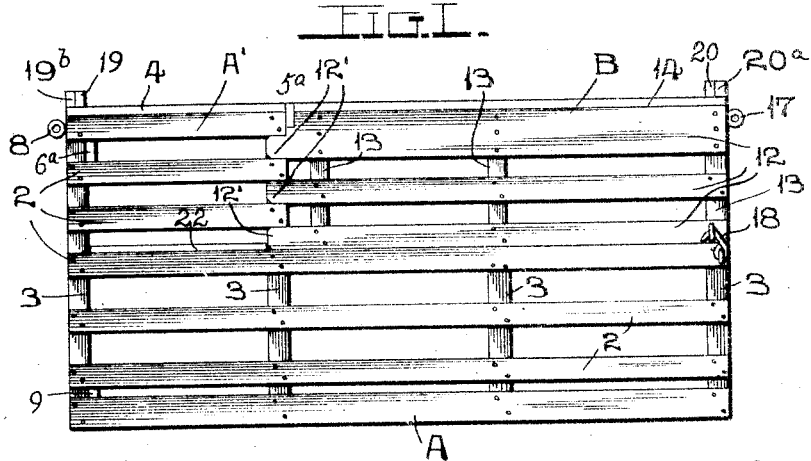
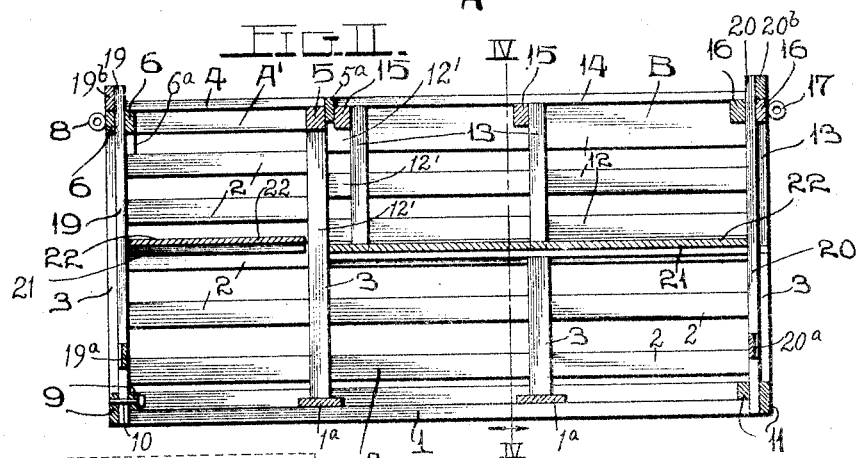
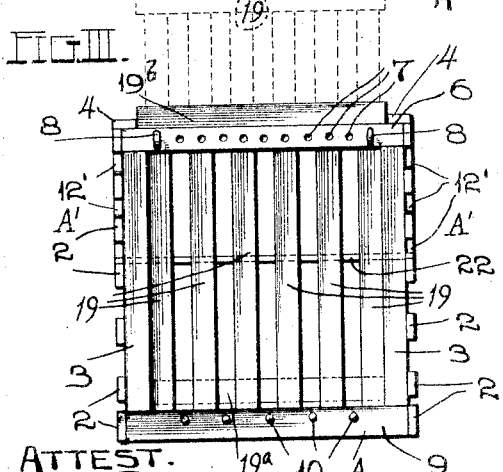
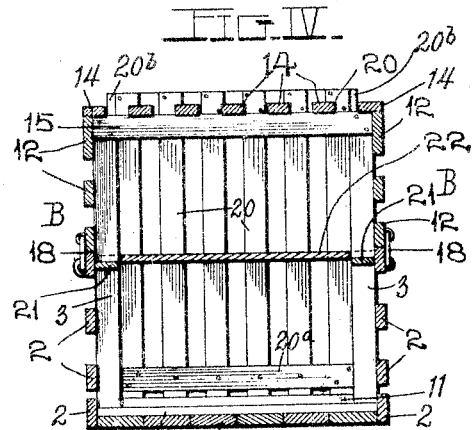

UNITED STATES PATENT OFFICE.

CHARLES E. KNIGHT, OF SHELBYVILLE, ILLINOIS.

SECTIONAL HOG AND POULTRY CRATE.

No. 882,893.  Specification of Letters Patent.  Patented March 24, 1908.

Application filed June 24, 1907. Serial No. 380,454.

*To all whom it may concern:*

Be it known that I, CHARLES E. KNIGHT, a citizen of the United States of America, residing in Shelbyville, in the county of Shelby and State of Illinois, have invented certain new and useful Improvements in Sectional Hog and Poultry Crates, of which the following is a full, clear, and exact description, reference being had to the accompanying drawings, forming part of this specification.

My invention relates to a hog and poultry crate so constructed that it may be of service for hauling either hogs or poultry and that when not in use for the purposes named, may be employed for confining hogs in ringing, marking and surgical operations and in breeding.

Figure I is a side elevation of my crate in its entirety. Fig. II is a longitudinal section taken through the crate in the condition in which it is illustrated in Fig. I. Fig. III is an end elevation of the crate in condition in which it is illustrated in Figs. I and II. Fig. IV is a vertical cross section taken on line IV—IV, Fig. II. Fig. V is a side elevation of the crate the top section and the rear slide door being omitted. Fig. VI is a plan view of the crate the top section and both of the slide doors being omitted. Fig. VII is an end elevation of the crate in the condition illustrated in Fig. VI and showing the hog holding lever in position. Fig. VIII is an enlarged elevation showing the lower end of the hog holding lever in engagement with one of the keeper pins at the bottom of the crate.

A designates the main or lower section of my crate and B the supplemental or upper section. The main section A is provided at its front end with an upward extension A' that surmounts the lower portion of the main section and with which the supplemental section B is adapted to mate, whereby the rear portion of the main section is rendered of less height than the forward portion of the main section, as seen in Fig. V, and the entire crate may be made of uniform dimensions throughout when the two sections A and B are assembled.

The main section of the crate comprises a main floor 1, having cross strips 1$^a$ side walls which are composed of longitudinal slats 2, united by uprights 3, a top that is composed of slats 4 united by a cross piece 5 and which extend only throughout the length of the extension A' as do also a portion of the side wall slats 2. The main section extension A' of the main section A also includes an inner top cross piece 5$^a$ connecting the sides of the main section extension, a pair of upper cross strips 6 extending transversely of the main section extension that are secured to the uprights 3 at the front end of the crate and spaced apart to provide a slot between them, and an outer top strip 6$^a$ also connecting the sides of the main section extension; the said upper cross strips 6 being provided with pinholes 7, see Figs. III and VII, adapted to receive one or more pins 8 that have utility as hereinafter mentioned. The main section also includes a pair of lower cross strips 9 extending transversely of the main section at its forward end and secured to the uprights 3 at the end mentioned, the lower cross strips being spaced apart to provide a slot between them beneath the slot between the upper cross strips 6 and having mounted therein pins 10, the purpose of which will be hereinafter stated. At the rear end of the main section A is a pair of bottom strips 11, see Fig. II, that are secured to the uprights 3 at the end of the crate mentioned and are spaced apart to provide a slot between them.

The supplemental section B of the crate comprises a series of side slats 12, uprights 13 connecting said side slats, top slats 14 united by transverse slats 15 and a pair of rear strips 16 which are located at the back end of the supplemental section and secured to the rear uprights 13, the said strips being spaced apart to provide a slot between them and being provided with pin-holes adapted to receive one or more pins 17, as seen in Figs. I and II. For the purpose of securing the supplemental section B to the main section A I extend the side slats of the supplemental section B beyond the foremost uprights 13 thereof so as to provide tongues 12', see Figs. I to III inclusive, that are adapted to enter between the side wall slats 3 of the main section extension A' to hold the section B to said main section extension and also provide hooks or latches 18 that are fastened to one of the sections of the crate at its rear end and adapted to engage an eye or keeper mounted in the other section of the crate, as seen in Figs. I and IV.

19 designates a slide door preferably composed of slats having bottom tie strip 19$^a$ and a top tie strip 19$^b$ and which is removably mounted in the front end of the crate in which it is fitted by introducing it first through the slot between the upper cross strips 6 and then lowering it between said upper cross strips into a position in the slot between the lower cross strips 9 in order that it will close the front end of the crate. The door is provided near its upper end with pin-holes that are adapted to receive one or more of the pins 8 introduced into the slot between the upper cross strips 6 and through the door.

20 is a rear door that has a bottom tie strip 20ª and a top tie strip 20ᵇ and is adapted to be introduced into the rear end of the crate to close said end when the sections B and A are united, the door being of similar construction to the door 19 and being introduced into a position between the upper cross strips 16 of the supplemental section B and the lower strips 11 of the main section A. This last named door is also provided with pin-holes that are adapted to receive one or more of the pins 17 inserted through the upper cross strips 16.

21 are foot strips that extend longitudinally of the main section A, see Figs. II, IV, and VI, and which are located along side of the side wall slats 2 at the top of the rear portion of the main section A at the inner side of said side wall slats and beneath the upper edges of the strips in order that the upper portion of said side wall slats may serve as guards for the feet of a hog when they are resting on the foot strips 21 which, as will be noted by reference to Fig. IV, are located at a considerable elevation above the bottom of the crate.

22 are false floor sections which are adapted to be supported by the side wall slats 2 of the main section A, these false floor sections being insertible and removable into the crate when the supplemental section B is disconnected from the main section A and they serve to sub-divide the crate into lower and upper decks in order that two floors may be afforded in the crate when in its complete condition for the transportation of a greater number of chickens or other poultry than could be transported in the crate in the absence of the false floor sections.

23 is a hog holding lever that is provided at its lower end with a catch pin 24 and at its upper end with a handle 25. This lever is adapted to be introduced into the slots between the upper cross strips 6 and the lower cross strips 9 at the front end of the crate when the front door 19 is absent from said slots and the catch pin of the lever is adapted to engage with one of the keeper pins 10 mounted in the lower cross strips 9, as illustrated in Figs. VII and VIII, in order that it may be of service in catching and holding a hog that has been driven into the crate through the rear end thereof and which is readily confined from escape through the front end of crate by so confining the holding lever through the medium of a single pin 8 placed back of the lever that the animal may pass its head only through the space between one edge of the lever and the facing side of the door-way at the front end of the crate. Instead of initially placing the lever as just stated the upper end of the lever may remain in a free condition when the hog is driven into the crate and as the head of the hog reaches the door-way at the front end of the crate the lever may be quickly thrown in a direction toward the neck of the hog to grip its neck between the lever and the facing side of the door-way after which the pin 8 may be put in place to hold the lever.

In hauling hogs the herein described crate is used in its entirety with the exception of the false floor sections, which are used only in hauling poultry, and the hog is crated by removing one of the slide doors and replacing it after the hog has been confined in the crate. When the hog is to be uncrated it is only necessary to remove the slide door which he faces in the crate and he will thereby be permitted to escape.

In the use of the crate for ringing and marking operations, the hog is driven into the crate with the sections A and B of the crate assembled and the front and rear doors absent from the crate and the holding lever 23 occupying the position normally occupied by the front door. The hog is driven through the rear door-way and confined in the manner stated through the medium of the lever 23. The hog being then held from movement may be operated upon as desired.

In confining and holding the hog for surgical operations the animal is driven into and confined in the crate in the same manner as that described preparatory to ringing and marking operations. The supplemental section B of the crate is then removed and access is readily gained to the animal for operations upon it when the crate is either in an upright position or laid upon its side.

When the crate is to be used for breeding purposes the hog is first driven into the crate, the supplemental section and rear door of the crate are then removed and the front door mounted in the main section A. A confining board or piece X, see Fig. V, is introduced through the rear portion of the main section A to prevent backward movement of the animal after it has been driven into the crate.

Claims:

1. A crate of the character described, comprising a main section having an upward extension at one end, and a supplemental section detachably mounted on said main section against the upward extension, substantially as set forth.

2. A crate of the character described, comprising a main section having an upward extension at one end, a supplemental section detachably mounted on said main section against the upward extension, and a door removably mounted in said main section and the upward extension thereof, substantially as set forth.

3. A crate of the character described, comprising a main section having an upward extension at one end, a supplemental section detachably mounted on said main section against the upward extension, a door removably mounted in said main section and the upward extension thereof, and a door common to, and removably mounted in, said main and supplemental sections at the other end of the crate, substantially as set forth.

4. A crate of the character described, comprising a main section having an upward extension at one end, and a supplemental section detachably mounted on said main section against the upward extension; said supplemental section being provided at its forward end with means for engaging the upward extension of said main section, substantially as set forth.

5. A crate of the character described, comprising a main section having an upward extension at one end, a supplemental section detachably mounted on said main section against the upward extension, doors for closing the ends of said sections, and a false floor detachably mounted upon said main section, beneath the supplemental section, substantially as set forth.

6. A crate of the character described, comprising a main section having an upward extension and slatted side walls, and a supplemental section detachably mounted on said main section against the upward extension and having side walls provided with extensions projecting into the spaces between the slats of said upward extension, substantially as set forth.

CHARLES E. KNIGHT.

In the presence of—
  LILY POST,
  WM. H. SCOTT.